(12) United States Patent
Dendauw et al.

(10) Patent No.: US 12,467,806 B2
(45) Date of Patent: Nov. 11, 2025

(54) TESTING FILM WITH DETERMINATION OF FORCE

(71) Applicant: ESTL N.V., Deerlijk (BE)

(72) Inventors: Jelle Carl Dendauw, Oostrozebeke (BE); Kristof Karel Maria Baeyens, Sint-Niklaas (BE)

(73) Assignee: ESTL NV, Deerlijk (BE)

( * ) Notice: Subject to any disclaimer, the term of this patent is extended or adjusted under 35 U.S.C. 154(b) by 287 days.

(21) Appl. No.: 18/275,707

(22) PCT Filed: Feb. 4, 2022

(86) PCT No.: PCT/IB2022/050990
§ 371 (c)(1),
(2) Date: Aug. 3, 2023

(87) PCT Pub. No.: WO2022/167994
PCT Pub. Date: Aug. 11, 2022

(65) Prior Publication Data
US 2024/0125662 A1    Apr. 18, 2024

(30) Foreign Application Priority Data
Feb. 5, 2021    (BE) .................................. 2021/5091

(51) Int. Cl.
*G01L 5/00*    (2006.01)
*B65H 23/182*    (2006.01)
*G01L 5/107*    (2020.01)

(52) U.S. Cl.
CPC .......... *G01L 5/0076* (2013.01); *B65H 23/182* (2013.01); *G01L 5/107* (2013.01);
(Continued)

(58) Field of Classification Search
CPC ..... G01L 5/0076; G01L 5/107; B65H 23/182; B65H 2301/5124; B65H 2701/1752
See application file for complete search history.

(56) References Cited

U.S. PATENT DOCUMENTS 3,950,988 A    4/1976    Nowisch
7,723,930 B2 *    5/2010    Kajander .................. G01L 5/10
                                                              318/6

(Continued)

FOREIGN PATENT DOCUMENTS

EP    0626313 A1    11/1994
EP    1933122 A2    6/2008
WO    2018071995 A1    4/2018

OTHER PUBLICATIONS

International Search Report and Written Opinion for Application No. PCT/IB2022/050990 dated Apr. 29, 2022.

*Primary Examiner* — Freddie Kirkland, III
(74) *Attorney, Agent, or Firm* — KDW Firm PLLC

(57) ABSTRACT

A device for measuring a stretching force on a film, including an unwinding station to hold and unwind a spool of stretch film via an unwinding motor, and including a first stretching station with a first driven stretch roller and a second driven stretch roller for imparting a predetermined first stretch to the stretch film. The device includes a second stretching station with a third driven stretch roller for imparting a second predetermined stretch to the stretch film. A sensor is provided in the unwinding station in order to measure a release parameter indicative of where the stretch film releases from the spool. A processor is provided to calculate a first and second force, needed to obtain respectively the first stretch and second stretch, on the basis of the release parameter and an output of the first, second, third torque meters and the unwinding torque meter.

14 Claims, 5 Drawing Sheets

(52) U.S. Cl.
CPC ............... *B65H 2301/5124* (2013.01); *B65H 2701/1752* (2013.01)

(56) References Cited

U.S. PATENT DOCUMENTS

| | | | |
|---|---|---|---|
| 11,016,019 B2* | 5/2021 | Dendauw | G01B 17/00 |
| 12,037,212 B2* | 7/2024 | Cere' | B65H 23/188 |
| 2008/0135666 A1* | 6/2008 | Kajander | G01L 5/10 |
| | | | 318/6 |
| 2019/0310181 A1* | 10/2019 | Dendauw | G01N 29/04 |

* cited by examiner

TESTING FILM WITH DETERMINATION OF FORCE

This application is a national stage filing under 35 U.S.C. 371 of pending International Application No. PCT/IB2022/050990, filed Feb. 4, 2022, which claims priority to Belgian Patent Application No. 2021/5091, filed Feb. 5, 2021, the entirety of which applications are incorporated by reference herein.

The invention relates to a measuring machine and a corresponding method for determining a stretching force in a film.

Stretch film is used in numerous processes, this stretch film typically being supplied on a spool. These can be highly diverse types of film, such as stretch wrap film for packaging goods, clingfilm, shrink wrap, decorative film as well as labels, self-adhesive paper and so on. The film which is wound onto the spool typically adheres to the underlying layer on the spool and must therefore be detached at the moment the film is unwound.

A first example of use of stretch film is known as stretch wrap film which is used to wrap palletized goods. In many cases a spool of film is placed on a wrapping machine. The film runs over guide rollers and then over two stretch rollers. The second stretch roller has a greater peripheral speed than the first stretch roller, whereby the film is stretched by a predetermined length percentage. This is referred to as the first stretch. The stretched film is then wrapped around the palletized goods, wherein the wrapping speed around the palletized goods relative to the peripheral speed of the second stretch roller provides for a second stretch. The second stretch can be positive, this providing for additional stretch relative to the first stretch, or negative, this being shrinkage relative to the first stretch, or neutral, wherein the first stretch is preserved. The extent to which the film is stretched has a significant effect on the effectiveness of the wrapped film.

Care is taken in practice that the film cannot slip over the stretch rollers, among other ways by providing a large contact arc and by covering the stretch rollers with a very high-friction material, optionally by suctioning film onto the rollers.

In order to test the behaviour and the quality of the film the ratio between the imparted stretch and the force needed therefor is relevant. Arranged for this purpose on the stretch rollers are force sensors which can measure the transverse force on the roller in the stretching direction. By correlating the information from the force sensors with the imparted stretch, the stretch of the film can be estimated. The fracture of the film can also be predicted. It is interesting to provide this information to end users of the film as well in order to give a concrete indication of the quality and the expectations for the user. A drawback of the force sensors is that they are susceptible to overloading and can consequently break easily.

It is an object of the invention to perform the force measurement in the device for testing a film more robustly.

The invention provides for this purpose a method for testing a stretch film, comprising of:
  unwinding a spool of stretch film in an unwinding station with a driven unwinding device;
  throughfeed through a first stretching station, wherein a predetermined first stretch is imparted to the stretch film between a first driven stretch roller and a second driven stretch roller;
  throughfeed through a second stretching station, wherein a predetermined second stretch is imparted to the stretch film by a third driven stretch roller;
  determining a first force on the film during the predetermined first stretch; and
  determining a second force on the film during the predetermined second stretch;
wherein the first force and the second force are determined on the basis of a measurement of an unwinding torque on the unwinding device, measuring a first, second and third torque on respectively the first, second and third driven stretch roller, and a measurement of a release parameter in the unwinding device which is indicative of where the film releases from the spool.

The invention is based on the insight that the force can be determined by calculating a so-called torque balance in the whole testing device. It is impossible in the first stretching station, where a predetermined first stretch is imparted to the stretch film between the first and second driven stretch rollers, to determine the force on the basis of only the torques of this first and second stretch roller. This is because the stretch film not only generates a force between the two rollers, which force has an effect on the torque, the stretch film also generates a tensile force when entering and exiting the first stretching station. According to the invention, it is possible to determine the force on the basis of torques by taking into account all torques imparted to the film in the device. Also taken into account is the release parameter, which has a significant effect on the force which develops in the film during unwinding from the spool. By taking into account these elements the force can still be accurately calculated with torques, without force sensors being necessary. Force sensors break easily, and are therefore not optimal. A torque can be measured with considerably sturdier components. It is therefore considerably more interesting to determine the forces in the film with torque sensors.

The third driven stretch roller is preferably configured to wind the stretch film onto a second spool. The radius of the second spool is preferably measured, wherein the first force and the second force are further determined on the basis of the radius of the second spool. This increases the accuracy of the determined force.

A radius of the spool in the unwinding station is preferably measured, wherein the first force and the second force are further determined on the basis of the radius of the spool. The release parameter is preferably indicative of the difference between a tangential reference plane of the spool and the effective plane in which the film which is pulled loose from the spool lies.

The release parameter is preferably determined by moving a sensor reciprocally about at least a part of the spool, wherein an angular position of the sensor at which the sensor performs a predetermined measurement forms the release parameter. The sensor can be embodied in different ways. A laser sensor or similar sensor can be aimed at the spool, wherein it is possible to determine on the basis of the reflection on the spool where, at which angle, the film releases from the spool. Alternatively, a laser sensor can move parallel to the spool at a distance therefrom in order to cross the film being unwound during the reciprocal movement. The reciprocal movement of the sensor can be rotational or linear, or a combination thereof. As a further alternative, a static camera is used to determine the point where the film releases from the spool on the basis of an image analysis in order to determine the release parameter on the basis of a static camera.

The first force and the second force are preferably further determined on the basis of a known first radius and second radius of respectively the first and second driven stretch roller.

The invention further relates to a device for measuring a stretching force on a film, wherein the device has adapted an unwinding station to hold and unwind a spool of stretch film, which unwinding station has an unwinding motor for controlling the rotation speed of the spool during unwinding of the stretch film, wherein the device further has a first stretching station with a first driven stretch roller and a second driven stretch roller for imparting a predetermined first stretch to the stretch film, and wherein the device has a second stretching station with a third driven stretch roller for imparting a second predetermined stretch to the stretch film, wherein the first, second and third driven stretch roller are provided with respectively a first, second and third torque meter, wherein the unwinding motor is provided with an unwinding torque meter and wherein a sensor is provided in the unwinding station in order to measure a release parameter which is indicative of where the stretch film releases from the spool, wherein a processor is provided to calculate a first force and a second force, needed to obtain respectively the first stretch and second stretch, on the basis of the release parameter and an output of the first, second, third torque meters and the unwinding torque meter.

The device allows the above stated method to be performed. The above stated advantages and effects apply analogously to the device.

The third driven stretch roller is preferably also provided to wind the stretch film onto a second spool. The second stretching station is preferably provided with a second spool sensor for measuring the radius of the second spool, wherein the processor is further provided to take into account an output of the second spool sensor when calculating the first force and the second force.

The unwinding station is preferably provided with a first spool sensor for measuring a radius of the first spool, wherein the processor is further provided to take into account an output of the first spool sensor when calculating the first force and the second force.

The release parameter is preferably measured by determining a distance between a tangential reference plane of the spool and the effective plane in which the film which is pulled loose from the spool lies. The sensor provided in the unwinding station to measure the release parameter is preferably mounted on a frame which is reciprocally movable relative to the axis of the spool, wherein an angular position of the sensor at which the sensor performs a predetermined measurement forms the release parameter.

The processor is preferably further provided to determine the first force and the second force on the basis of a known first radius and second radius of respectively the first and second driven stretch roller.

The invention will now be further described on the basis of exemplary embodiments shown in the drawings.

Figure 3A:
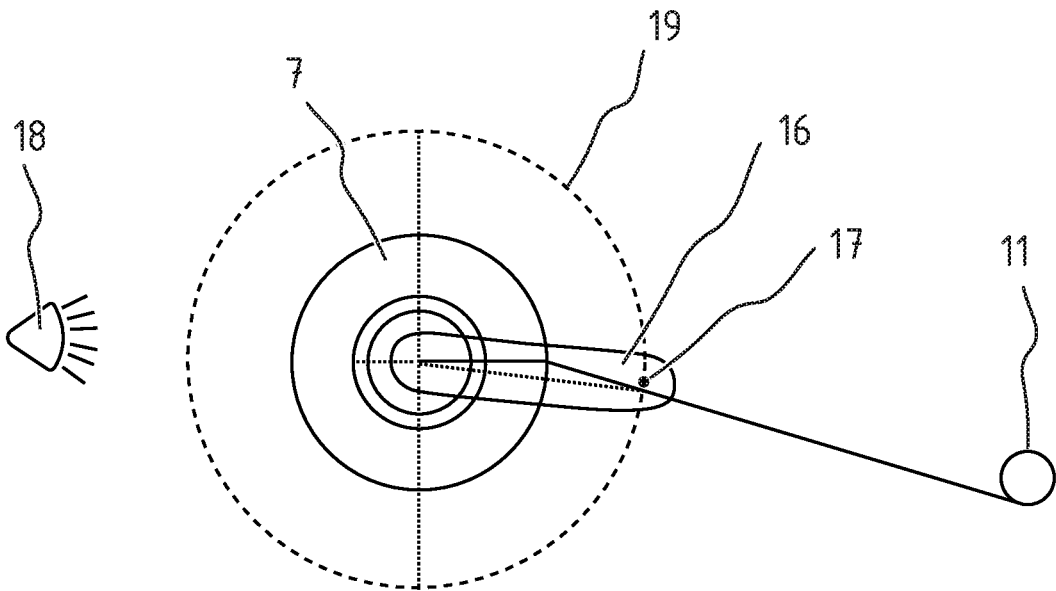
Figure 3B:
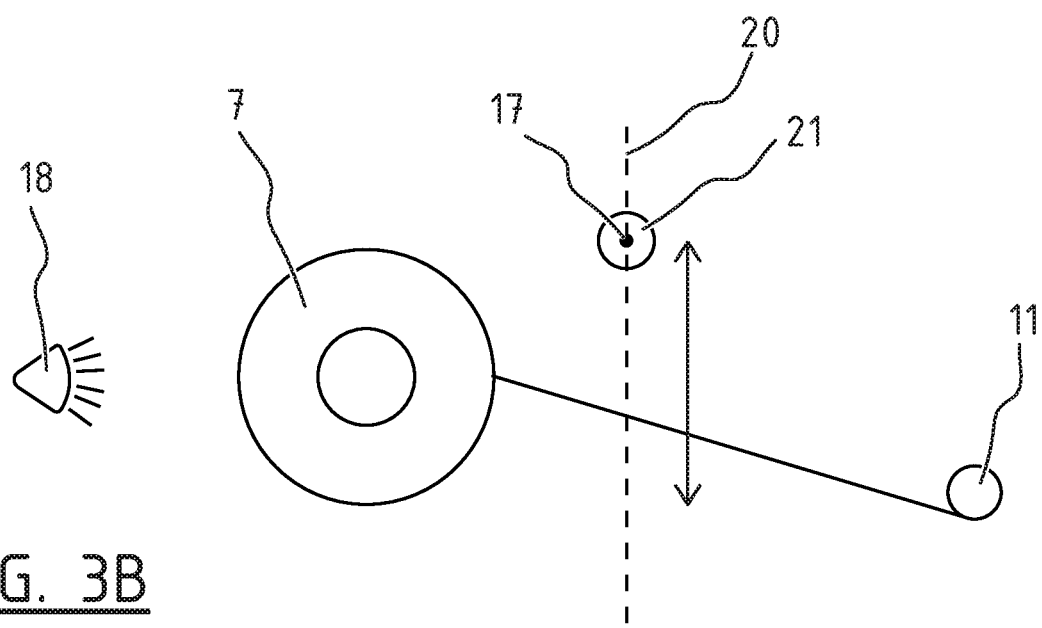
Figure 4A:
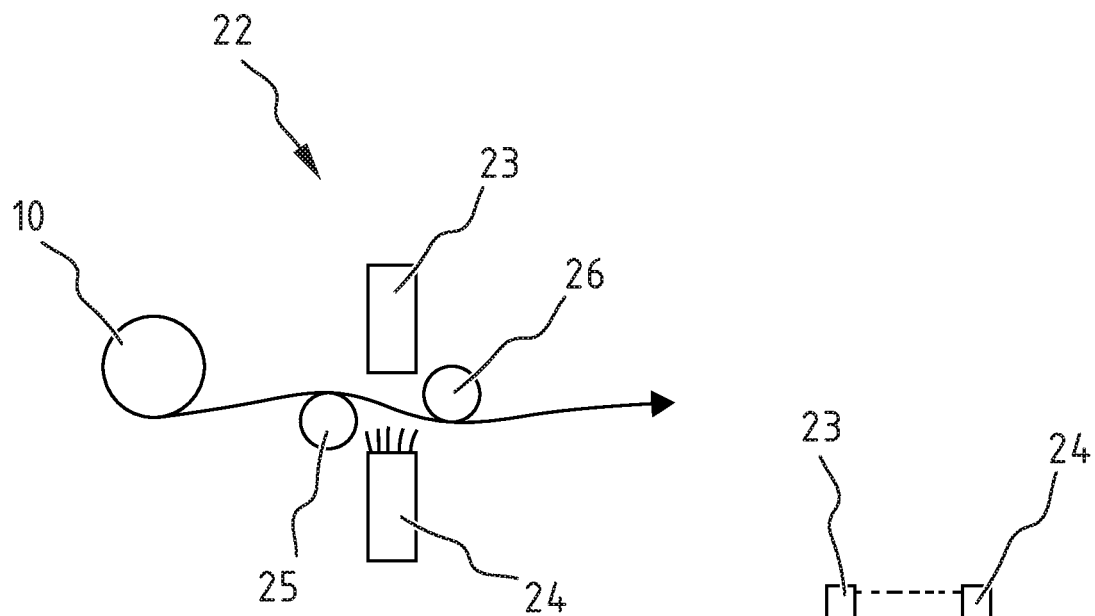
Figure 4B:
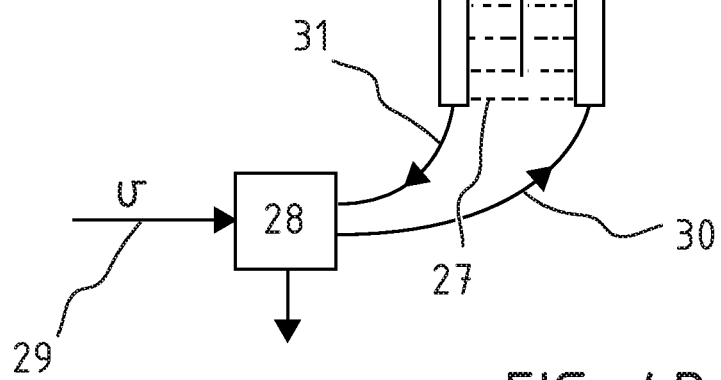
Figure 5:
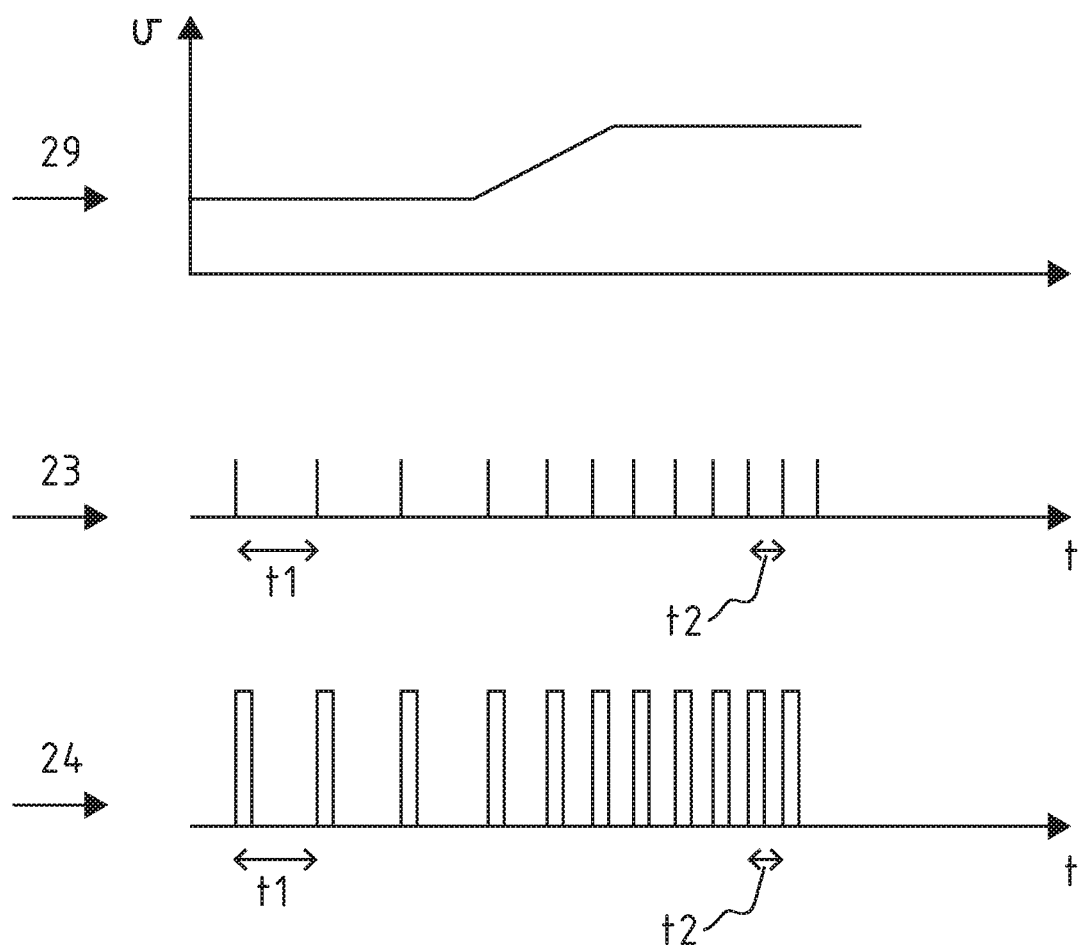

FIGS. 3A and 3B each show a setup of the unwinding station with sensor for determining the release parameter; and FIGS. 4A and 4B show a setup of a measuring device for measuring impurities in the stretch film according to an embodiment; and FIG. 5 shows a diagram illustrating the operation of the measuring device of FIG. 4.

The same or similar elements are designated in the drawings with the same reference numerals.

This description first describes a device 1 in which the invention can be applied. The invention was developed particularly for application in such a device, this being a testing device for films. The description further elucidates two aspects which are applicable in the device. A first aspect relates directly to the invention and another aspect is likewise applicable in combination with the invention.

Figure 1:
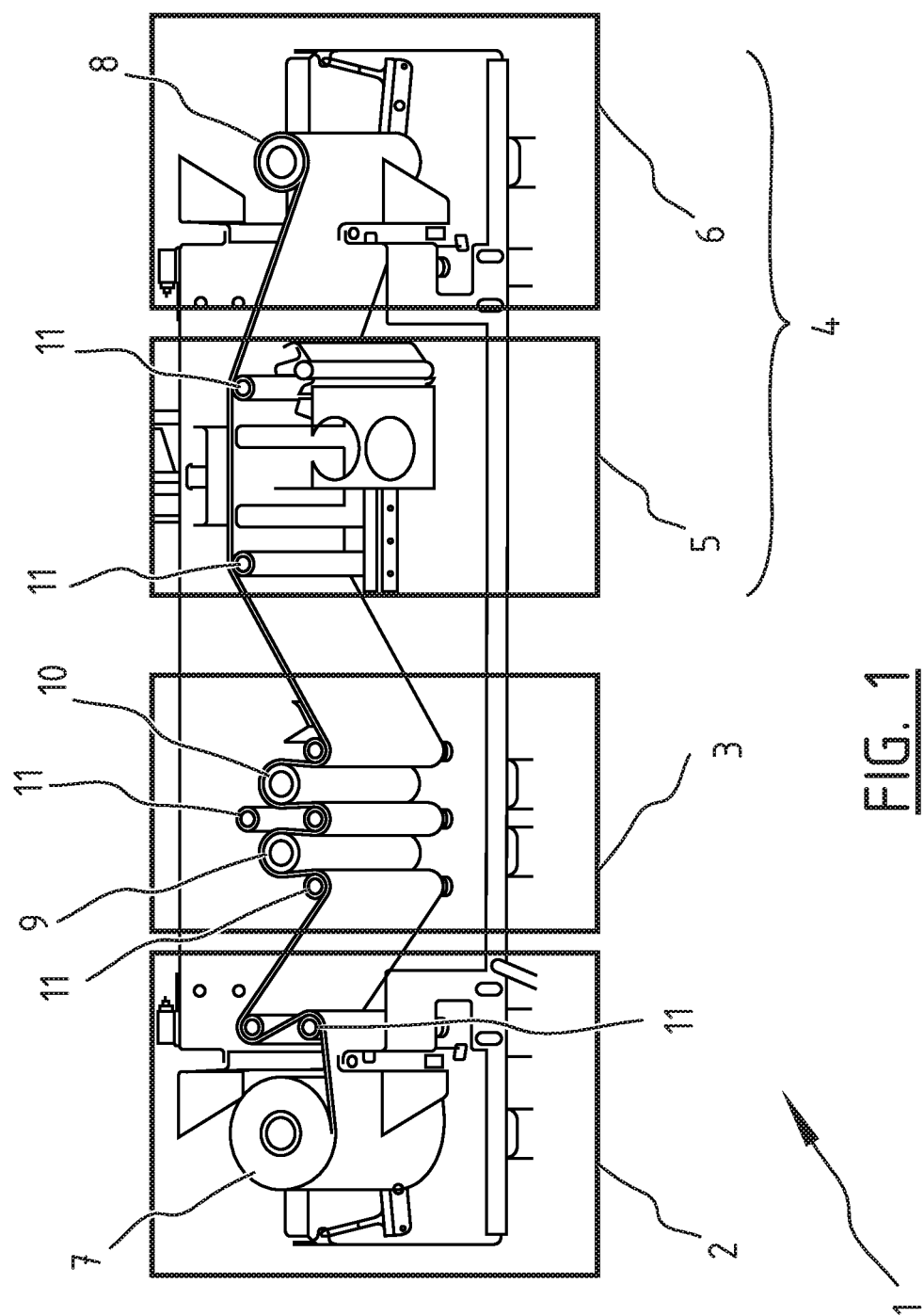
FIG. 1 shows a device in which the invention can be applied.

FIG. 1 shows a setup of a device 1 for testing films. The films that are tested are films that are elastically and plastically deformable by stretching the film. Such films are therefore referred to as stretch film. A stretch film is a film having a length which can be stretched by at least 50%, preferably at least 100% (at 100% stretch the film is twice as long after stretch as before stretch) without creating any appreciable tears or fractures in the film, at least when the film has no defects. The device 1 is intended to simulate different ways of using the stretch film and so determine the behaviours of the stretch film during use. For this purpose the device is provided to measure the properties of the stretch film before, during and after stretching.

Device 1 has at least three and preferably four stations. The stations follow each other so that the stretch film can be fed through the successive stations. Device 1 has an unwinding station 2, a first stretching station 3 and a second stretching station 4. In the shown embodiment the second stretching station 4 is formed by an attribute station 5 and a winding station 6. Features of each of the stations will be further elucidated below.

The unwinding station 2 is provided with holding means for holding a spool 7. Spool 7 comprises the stretch film which has been wound onto it. The spool can be clamped between a lower and upper clamp. The holding means can alternatively have a shaft or roller which is placed into a central opening of the spool and so holds the spool. The holding means are further provided to drive the spool to unwind the film from the spool. These holding means are therefore also referred to as the unwinding device. The unwinding station comprises a motor, typically an electric motor, for unwinding the spool in controlled manner. The electric motor makes the rotation speed of the spool during unwinding controllable and variable. By providing the electric motor the unwinding device becomes a so-called driven unwinding device. The unwinding station can have one or more auxiliary rollers 11 to guide the film through the further device 1. These auxiliary rollers 11 may be used or may not be used, depending on the application, on the rotation direction of the spool, on the type of test being performed and on the preferences and the wishes of the operator.

The first stretching station 3 is provided directly adjacently of the unwinding station. Stretch film coming from unwinding station 2 enters the first stretching station 3. First stretching station 3 has a first stretch roller 9 and a second stretch roller 10. The two stretch rollers 9 and 10 are each provided with a motor, typically an electric motor, for driving the stretch rollers 9 and 10. Stretch rollers 9 and 10 can be driven independently of each other, whereby the stretch rollers 9 and 10 can have different rotation speeds. Having the second stretch roller 10 rotate more quickly than the first stretch roller 9 will cause the stretch film to be stretched between the first and second stretch rollers. The stretch is here determined by the difference in peripheral speed between first stretch roller 9 and second stretch roller 10. Each stretch roller 9, 10 preferably has a predetermined diameter. The surface of each stretch roller 9, 10 is preferably formed by a material with an above-average slide resistance for a stretch film. The cylindrical surface of each stretch roller 9, 10 can thus be provided with a rubber top layer.

The first stretching station 3 preferably comprises a plurality of auxiliary rollers 11. The auxiliary rollers 11 are provided to optimize the entry angle and the detaching angle of the stretch film relative to the two stretch rollers 9, 10. It is advantageous here for a stretch film to lie, as seen in cross-section, against at least a quarter of and preferably against at least half of the outer surface of each of the two stretch rollers 9, 10 during operation of the device. This means that each stretch roller 9, 10 causes the stretch film to make a turn of at least 90 degrees, preferably of at least 180 degrees. The figure shows a so-called W-configuration wherein the film runs over the stretch rollers in the form of a W. One of the more centrally placed auxiliary rollers is not used here. In another configuration the film can be carried over the stretch rollers in an S-shape, wherein one of the peripheral auxiliary rollers is not used.

The first stretch roller 9 has a dual function. On the one hand this first stretch roller pulls the stretch film away from the spool in unwinding station 2. Unwinding station 2 can here drive the spool in the rotation direction so that the force needed for first stretch roller 9 is determined substantially by the adhesive force of the film on the spool. Alternatively, the unwinding station can slow down the spool, i.e. exert a torque in the direction opposite to the rotation direction of the spool. The force needed for the first stretch roller 9 to unwind the spool will hereby be considerably greater than in the previously described situation. In this way the force exerted on the stretch film between the spool and the first stretch roller 9 can be controlled. This force provides for a prestress or prestretch on the stretch film. The prestretch can be measured by comparing the peripheral speed of the spool to the peripheral speed of first stretch roller 9.

On the other hand, first stretch roller 9 provides for a force counter to the tensile force of the second stretch roller 10. Second stretch roller 10 rotates at a speed which is typically a predetermined variable or constant value higher than that of first stretch roller 9. The second stretch roller 10 thereby exerts on the stretch film a tensile force which ensures that the stretch film is stretched. Stretching of the stretch film implies that at least an elastic the formation is imparted, wherein in most situations a plastic deformation also occurs. The film hereby becomes longer, at least in the direction of movement, between the first stretch roller 9 and the second stretch roller 10. The factor is determined by the difference in peripheral speed between the first and the second stretch roller 9, 10.

In the shown embodiment the second stretching station 4 is formed by an attribute station 5 and a winding station 6. The attribute station 5 is less relevant for the aspect of the invention discussed in this patent text. In practice the attribute station 5 serves to perform tests on the stretch film other than the stretching of the film in the direction of movement. A stretch transversely of the direction of movement can thus be performed in attribute station 5. Provided after attribute station 5 is a winding station 6. Provided in winding station 6 is a second spool 8 for winding up the stretch film. In the device the stretch film will therefore successively be unwound from spool 7 in unwinding station 2, fed through the first stretching station 3, fed through the attribute station 5 and then be wound onto the second spool 8 in winding station 6.

Winding station 6 is provided with holding means for holding the second spool 8. Second spool 8 is provided for winding the stretch film onto after the stretch film has been fed through device 1. Spool 8 can be clamped between a lower and upper clamp. Alternatively, the holding means can have a shaft or roller which is placed into a central opening of the second spool and so holds the second spool. The holding means are further provided to drive the second spool in order to unwind the film from the spool. The winding station comprises a winding motor, typically an electric motor, for controlled winding onto the spool. Via the electric motor the rotation speed of the second spool is controllable and variable during the winding up. By providing the electric motor the winding device becomes a second stretching station with a so-called third driven stretch roller. The third driven stretch roller is formed by second spool 8. By driving the second spool 8 a second stretch can be imparted to the stretch film on the basis of a difference in peripheral speed between second spool 8 and second stretch roller 10. This second stretch can be positive or negative. A negative stretch is the same as shrinkage. The winding station can have one or more auxiliary rollers (not shown in winding station 6 of FIG. 1) to guide the film to the second spool 8.

Figure 2:
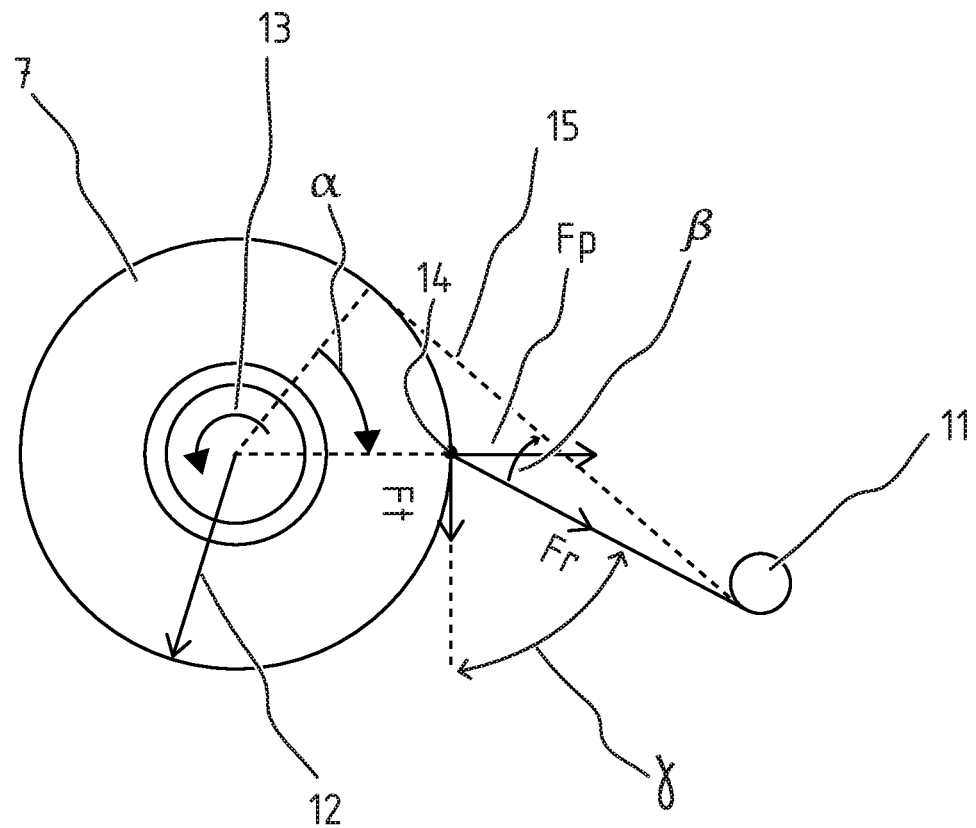
FIG. 2 shows a schematic view of forces and effects occurring during unwinding from a spool.

A phenomenon, which is elucidated with reference to FIG. 2, occurs in unwinding station 2 during unwinding of spool 7. The film releasing from spool 7 is fed to a first auxiliary roller 11. The force required for this purpose is largely supplied by the first stretch roller 9, as elucidated above. A tensile force Fr is present in the film situated between the spool 7 and the next auxiliary roller 11. Spool 7 has a radius r, designated with reference numeral 12. FIG. 2 further shows a rotation-resisting torque M of the spool, designated with reference numeral 13, which torque can be imparted to the spool by the relevant electric motor. The tangential force Ft can be calculated as M/r=Ft. The radially oriented detaching force Fp is perpendicular to the tangential force Ft. The tensile force Fp in the film can be calculated as Fr is the square root of the sum of the squares of Ft and Fp. Another relationship is Fp=Ft×tgγ, wherein γ is the angle between the plane tangential to the spool on the one hand and the film on the other. The detaching force can therefore be determined by measuring the angle γ when the resistance of the spool to unwinding is known. This detaching force can be used on the one hand as a quality feature of the film and can be used on the other to determine the overall force FF in the film, and so of the prestress or prestretch in the film. For this reason the location of the point 14 where the film releases from spool 7 is determined in one or more cross-sections of the spool, after which the tensile force in the film after the film has released can be determined. This principle does not depend on the rotation speed of the spool, on the distance between the outer side of the spool and the axis of the spool, on the material and the colour of the film. Nor does this principle depend on the way in which the angle γ is measured. Different ways of measuring the angle γ can be envisaged. Application of this principle has the particular advantage that both the forces Fp and Fr are determined without damaging the film and that it can be used at any radius of the spool and at any unwinding speed.

In the case that no detaching force Fp is required, the film will release from spool 7 in a plane 15 which on the one hand touches the spool and on the other touches the next auxiliary roller 11. This plane is called the reference plane 15. In such a situation the angle γ it is equal to zero, and the force Fp is therefore also zero. The force Ft, which equals M/r, therefore becomes equal to Fr, which indicates the force in the film. The greater the detaching force required, the larger the angle β between the film which has been detached and the reference plane 15 will become, and the point 14 where the film releases will be rotated on the spool through an angle α in the direction of rotation of the spool during unwinding. When the point 14 where the film releases from the spool is known, angles α and β can be calculated. After determining the net torque M which counteracts the rotation of the spool and after determining the radius 12 of the spool by means of measurement or calculation, the force Ft can be calculated as Ft=M/r, the detaching force Fp can be calculated as Fp=FT× tgγ and the overall film force Fr can be calculated as Ft/cos γ, wherein γ=α+β.

A sensor, described further below, determines the point 14 where the film releases from spool 7. According to a first embodiment, the sensor is provided to transmit a wave to spool 7 radially toward the axis of spool 7, and to pick up the reflected wave only if the reflected wave evolves radially away from the spool. The sensor is moved reciprocally around spool 7 while the emitted wave remains directed radially toward the axis of the spool. The intersection between on the one hand the enveloping cylinder of the spool and on the other the line of the emitted wave at the moment of the transition between the reflected wave being received and not being received provides the point where the film releases from the spool. After all, when the emitted wave is incident on film which is wound around the spool, the wave is reflected radially. When the emitted wave is incident on film which has released from the spool, the wave will no longer be reflected radially and the reflected wave will no longer be detected by the sensor.

The force Fr, which has been described above, is the force on the film between the spool in unwinding station 2 and the first stretch roller 9 in first stretching station 3. The pre stretch created in this zone as a result of the force Fr can be determined by comparing the peripheral speed of the spool to the peripheral speed of the first stretch roller 9. The peripheral speed is equal to the angular speed, which can be expressed in different ways such as for instance revolutions/minute, times the periphery. The periphery of a stretch roller 9 or spool will be understood to be the cross-sectional periphery, determined by 2×pi×the radius.

Because the force Fr upstream of first stretch roller 9 is known, the force downstream of first stretch roller can also be calculated on the basis of the torque. More specifically, the torque×the radius of first stretch roller 9 equals the sum of the forces, this being the sum of the upstream force and the downstream force, taking their direction of force into consideration. The force in the film between the two stretch rollers 9 and 10 can therefore be calculated by measuring the torque imparted to the first stretch roller. This is an important parameter for determining the quality of the film. The force in the film downstream of the second stretch roller 10 can be calculated in wholly analogous manner. On the basis of this explanation the skilled person will appreciate that a so-called equilibrium of forces can be calculated in the device on the basis of the measured torques, radius of the spool and the release parameter formed by the angle of the film relative to the plane of the spool when it releases therefrom. This equilibrium of forces can be precisely calculated in order to determine the forces on the stretch film in the various stations of the device without using force sensors and working only with torque sensors.

As already stated above, the release parameter, which is indicative of the angle γ, can be measured in different ways. According to an embodiment, use is made of a sensor which emits and receives an ultrasonic sound wave at least when the reflected ultrasonic wave evolves radially in relation to the spool. Transmitter and receiver are mounted on a holder which rotates reciprocally round the axis of spool 7. The plane formed by the axis of the spool and the transmitter thus forms a variable angle δ with the reference plane. In a possible application of this embodiment the movement of the sensor begins at an angle δ of −180° from the reference plane, wherein a positive angle δ corresponds with the positive direction of angle α. During the movement of the sensor wherein δ evolves from −180° to −90°, the signal which corresponds with the reflected wave is averaged. This average value forms a reference value. During the further evolution of angle δ the measured value of the received signal is compared to this reference value and the direction of movement of the sensor is reversed as soon as the measured value is lower than a chosen fraction (k1) of the reference value. The direction of movement is reversed again as soon as δ=−90° or as soon as the measured value is higher than a chosen fraction (k2) of the reference value. This results in a reciprocating movement around the point 14 wherein the film releases from the spool. In an optional subsequent step of the method of this aspect of the invention, the position of point 14 is unambiguously defined as the point for which the progressive average value of the received signal is lower than a fraction (k3) of the reference signal during a chosen number of reciprocating movements, wherein k1<k3<k2. In a preferred embodiment of the device k1=10%, k2=90%, k3=50%.

In a further embodiment the radius 12 of spool 7 is determined. In a first possible embodiment, this takes place by measurement with an individual sensor. In a second possible embodiment this takes place by measurement with the ultrasonic sensor which detects the point 14 where the film releases from the spool. The radius is measured again each time the sensor is located with certainty at an angle δ wherein the emitted wave is incident on film which has not released from spool 7. In a third possible embodiment the radius is calculated on the basis of an initial value which is corrected with the layer thickness of the layers which have already been unwound. In a fourth possible embodiment two or more of the previous embodiments are combined.

FIG. 3 shows two further embodiments for measuring the release parameter. In both embodiments a sensor is mounted movably in a plane lying below or above the film. The sensor is oriented substantially parallel to the spool. By moving the sensor in the plane the sensor will measure a differing value at the moment that the sensor comes to lie below the film. When the sensor is a light sensor, the optical reflection will typically be disturbed by the film. When the sensor measures a distance, the measured distance will be influenced by the film. Different types of sensor can be applied to measure a differential value. Measuring the position of the sensor at the moment that the differential value is measured enables the release parameter to be calculated.

FIG. 3A shows an embodiment wherein the sensor 17 is provided on a pivot arm 16. The pivot arm 16 is reciprocally movable about a pivot arm axis which preferably coincides with the axis of spool 7. The distance between sensor 17 and the pivot arm axis is probably greater than the radius of the largest spool 7 placeable in unwinding station 2. When a sensor is moved reciprocally by the pivot arm, the sensor will thus detect film only when the sensor is located below or above and almost in the plane of the stretch film extending between spool 7 and first auxiliary roller 11. In other words, the sensor will detect the stretch film at the locations where the plane of the stretch film crosses the path of movement of the sensor. The path of movement of sensor 17 is shown in FIG. 3A with broken line 19. By reading the position of the sensor or of pivot arm 16 at the moment of detection by the sensor and storing it or forwarding it or processing it with a processor the release parameter can be determined. The skilled person will appreciate here that the release parameter will typically depend on the radius of the spool at the moment of the detection. The radius can be measured by a distance sensor 18. Alternatives for determining the radius have been described above.

FIG. 3B shows a further embodiment wherein the sensor 17 is movable along a linear path of movement 20 via a carriage 21. The above described principles are likewise applicable in this embodiment. This is because the sensor will detect film when the sensor is in the position where the path of movement 20 crosses the plane of the film. Registering this position enables the release parameter to be determined.

The skilled person will appreciate that in both the embodiment of FIG. 3A and the embodiment of FIG. 3B the sensor 17 is efficiently movable over the respective path of movement 19, 20. More specifically, it is unnecessary during operation for sensor 17 to be carried along the whole path of movement 19, 20. In a first step the position of the stretch film is preferably sought, which may require a larger movement being made with the sensor. Once the position of the stretch film has been found, the sensor 17 can be moved reciprocally over the path of movement with a predetermined hysteresis. This means that a predetermined overshoot or additional distance following detection of the film is in each case travelled before reversing the direction of movement. The skilled person will appreciate that the angle γ can be calculated with basic geometry on the basis of a known position of the sensor at the moment of detection.

FIG. 4 shows a measuring device 22 which can be applied to device 1. The measuring device 22 forms a second aspect of the invention and allows a correlation to be established between impurities in the stretch film on the one hand and the measured force and stretched in the film on the other. Measuring device 22 is preferably constructed with a camera 23 and light 24. Camera 23 is preferably a line camera placed on a first side relative to the stretch film. Light 24 is preferably a line light placed on a second side relative to the stretch film. The length of the line light is preferably substantially the same as the length of the line camera. The stretch film is preferably provided to run between camera 23 and light 24. The line camera and the line light preferably lie parallel to each other at a distance smaller than 20 cm, preferably a distance smaller than 15 cm, more preferably distance smaller than 10 cm. From a viewpoint of the line camera, the line light provides for a backlight for the stretch film. As shown in FIG. 4B, the light will shine through the film and into camera 23.

Preferably provided close to the location where the stretch film enters and exits between respectively camera 23 and light 24 is an entry roller 25 and an exit roller 26. Entry roller 25 and exit roller 26 have a dual function. On one hand the rollers 25 and 26 serve to guide and thereby position the stretch film between camera 23 and light 24. On the other hand the rollers 25 and 26 ensure that camera 23 is shielded from part of the ambient light. The combination of line camera 23 with light 24 as backlight and rollers 25 and 26 which at least partially screen ambient light enables camera 23 to be provided without shutter. In other words, camera 23 is always open. Because a shutter need not be provided on line camera 23, line camera 23 can be embodied considerably more simply and cheaply.

A line camera 23 typically has one single line of pixels. The image recording frequency of line camera 23 is preferably related to the speed of movement of the film. The faster the film, the higher the image recording frequency. By determining a fixed ratio between the image recording frequency and the speed of the film a constant image of the film can be formed. More specifically, each image recording will represent an equal distance of film. Combining the successive images of line camera 23 allows a two-dimensional image of the film to be formed.

Because the image recording frequency of line camera 23 is not constant, a lighting problem results. This is typically solved by the shutter. The line camera 23 of the invention preferably does not have a shutter. The amount of light incident on the camera between two successive image recordings must however be constant in order to form the image constantly. This is controlled by line light 24. The line light is preferably a pulsating light, wherein the intensity and duration of the pulse are predetermined and wherein the pulse frequency is controllable. FIG. 4B shows that a processor can be provided to receive images from line camera 23, see arrow 31. The processor receives or has input about the speed v of the stretch film, see arrow 29. On the basis of this input about the speed v the processor controls light 24, see arrow 30. On the basis of the input about the speed v the processor also controls line camera 23 to control the image recording frequency.

FIG. 5 shows the effect and the operation of the above-described combination. FIG. 5 shows at the top the speed v of the stretch film passing between the line camera and the light. This speed is drawn in FIG. 4B as input 29 to the processor. On the basis of the speed the camera 23 is read with a frequency directly proportional to the speed. The object is to keep the recording frequency and the distance of passed film at a fixed ratio. An image recording can thus for instance be made every 0.1 mm of film.

Because no shutter is provided on line camera 23 and the time for forming the image, see the difference between t1 and t2 in FIG. 1, depends on the speed of the stretch film, the light 24 is also controlled. FIG. 5 shows at the bottom the light pulses which have an intensity, see the height of each pulse, and a duration, see the width of each pulse. The frequency of the light pulses is controlled such that one light pulse is generated by light 24 for each image recording cycle of camera 23. It is partly because of the entry roller 25 and exit roller 26, which partially shield camera 23 from ambient light, that the amount of light incident on the line camera per cycle can be deemed substantially constant. A stable image can thus be obtained.

The processor 28 is provided to process the results from camera 23 in assembled form or as yet unassembled form. Process is understood to mean that processor 28 will detect impurities on the basis of predetermined image processing rules. Processor 28 carries out an analysis of the number of impurities, the size of the impurities and the distribution of the impurities over the length and width of the stretch film. This information is correlated to other information measured in the device, for instance to the force relative to the stretch, as described at length above. In this way properties and behaviours of the film during use can be linked to the number, type and the distribution of the impurities. Measuring the impurities during production makes it possible already to form an estimation of how the film will behave during production of the film. It is also possible to intervene in the production process during production in order to keep the number of impurities, the size of the impurities and the distribution of the impurities within predetermined limits. In this way a quality label can be assigned to a film.

A further aspect of the invention will be discussed below. Recycling of plastics including plastic films is already commonplace and socially supported in many places. This means that plastics including plastic films are collected after their first use and processed into recycled raw material for manufacturing a new plastic product. In the context of a circular economy a need arises for recycling to take place not only after the first use of a plastic film, but also before the first use. This means that at least a part of the raw materials for manufacture of a plastic film will come from the recycling circuit.

It is particularly in stretch films that the quality of the raw material is a highly defining factor for the operating characteristics of the final product. Impurities in the raw material have a particularly significant influence on the stretchability of the film. When the raw material for manufacturing a film comprises a mixture of new plastic and recycled plastic, it is impossible to predict with existing techniques how a film will behave. It is even impossible, particularly because the number and the type of impurities in the recycled plastic is variable, to find an optimal mixture of new and recycled plastic through experimentation.

It is an object of a further aspect of the invention to determine the quality of the stretch film in a reliable manner when film is manufactured on the basis of a mixture of new and recycled plastic.

For this purpose a further aspect of the invention provides a method for testing a stretch film, comprising of:
 unwinding a roll of stretch film in an unwinding station;
 successive throughfeed through a first stretching station and a second stretching station for controlling respectively a first stretch and a second stretch according to a predetermined first and second stretch pattern until a predetermined result is achieved;
 measuring impurities in the stretch film; and
 correlating the measured impurities to the predetermined result.

According to a further aspect of the invention, a stretch film is tested in a machine by feeding the stretch film from an unwinding station to a first and a second stretching station. In each station a predetermined stretch pattern is imparted in order to perform a predetermined test. This predetermined test produces a result which can be predetermined in different ways. Various practical situations can be simulated hereby, and the behaviour of the film in these various practical situations can be determined. The invention is based on the insight that when impurities are measured in the film during testing, the results of the test can be correlated to the measured impurities. The way in which a film reacts in different circumstances can also be linked directly to the impurities in the film. In other words, a quality of the film can be linked directly to the impurities. This makes it possible to attribute for instance a poor quality of a small segment of the film to an exceptionally high number of impurities in this segment, without thereby arriving at an unnecessarily negative assessment of the quality of the whole spool. This allows the quality of a film to be determined in a reliable manner when film is manufactured on the basis of a mixture of new and recycled plastic.

The predetermined first and second stretch pattern are preferably related to one of a tensile test and a consistency test and the predetermined result relates to a force in the film under a predetermined stretch or fracture, wherein the method further comprises of measuring the force in the film under at least one of the first stretch and the second stretch. In a tensile test the stretch on the film is increased systematically until fracture occurs. The measured impurities can here be correlated to the moment of fracture in order to relate fracture properties of the film to the impurities. In a consistency test a predetermined stretch or a predetermined stretch pattern is imparted to the film and the force needed to realize the predetermined stretch or the predetermined stretch pattern is measured. This force can then be related to the impurities in order to determine the effect of the impurities on the strength of the film. A combination of the two tests can also be performed, wherein a force is measured in relation to a stretch until fracture.

Measuring of impurities is preferably performed by a line camera which is placed in one of the unwinding station, first stretching station and second stretching station. A line camera is a one-dimensional camera which can form an image of one line of the film, which line preferably lies transversely of the direction of movement of the film.

An image recording frequency of the line camera is preferably operatively coupled to one of the unwinding station, first stretching station and second stretching station, such that the image recording frequency is substantially directly proportional to a throughfeed speed of the stretch film in the relevant station. By coupling the speed of movement of the film to the image recording frequency of the line camera a consistent image can be formed of the film, irrespective of the speed and/or speed variation of the film.

A line light is preferably placed opposite the line camera, such that the stretch film is feedable between the line light and the line camera. The line light provides for a direct light incidence onto the camera. Because film is typically translucent, the line light can be placed behind the line camera so that impurities are outlined sharply in the camera. Tests have shown that this setup is optimal for detecting impurities in a film using a camera. The same principle can also be applied to coloured film, for instance when a determined stretch is imparted. The stretch reduces the opacity of the film. The contaminants in the film will typically have a higher opacity than the film itself. Defects are consequently detectable.

The line light is preferably provided to generate light pulses of a predetermined length and intensity at a predetermined light pulse frequency, wherein the light pulse frequency of the line light is operatively coupled to the one of the unwinding station, first stretching station and second stretching station, such that the light pulse frequency is substantially directly proportional to a throughfeed speed of the stretch film in the relevant station. The line light and the line camera are preferably operatively coupled such that the image recording frequency is substantially synchronous to the light pulse frequency.

A light pulse with a predetermined length and intensity provides for a predetermined light incidence onto the camera. By adapting the pulse frequency directly or indirectly to the image recording frequency it can be ensured that the camera receives a substantially predetermined quantity of light during each recording. This is not controlled by providing a shutter on the camera, but by dosing the light which is incident on the camera. Tests have shown that ambient light has only a minimal effect in normal operation of this setup. Because the camera can be provided without shutter, the camera is considerably simpler and cheaper.

The method preferably further comprises of producing stretch film and winding the stretch film onto a spool, wherein production impurities in the produced stretch film are measured before the winding up and wherein a quality label is assigned to the spool on the basis of the correlation and the production impurities. By accumulating knowledge about the effect of impurities in a film a meter can be placed during the production process in order to measure the impurities in the produced film. The results of this measurement can be used to control the process of production, for instance by varying the ratio of new to recycled raw material. Additionally and/or alternatively, the results of the measurement can be used to assign a quality label to a produced film, wherein a film with fewer impurities is assigned a higher quality than a film with fewer impurities. The distribution of the impurities, the size of the impurities and the number of impurities will here all have an effect on the quality label. It will also be possible to relate the distribution of the impurities, size of the impurities and the number of impurities to the result of the mechanical tests on the film and so be able to estimate the effect and/or impact of these factors on the quality of the film.

A further aspect of the invention further relates to an apparatus for testing a stretch film, comprising:
- an unwinding station for unwinding a spool of stretch film;
- a first stretching station and a second stretching station for throughfeed of the stretch film and for controlling respectively a first stretch and a second stretch according to a predetermined first and second stretch pattern until a predetermined result is achieved;
- a measuring device for measuring impurities in the stretch film; and
- a processor configured to correlate the measured impurities to the predetermined result.

The apparatus was developed for performing the above described method. The advantageous effects attributed above to the method similarly apply to the apparatus.

The second stretching station preferably comprises a winding mechanism for winding up the film which was fed through the apparatus. The measuring device preferably comprises a line camera. The measuring device preferably comprises a line light aimed at the line camera, such that film is feedable between the line camera and line light.

The line light is preferably provided to generate light pulses of a predetermined length and intensity at a predetermined light pulse frequency, wherein the light pulse frequency of the line light is operatively coupled to the apparatus so as to be substantially directly proportional to a throughfeed speed of the stretch film.

The line light and the line camera are preferably operatively coupled such that an image recording frequency of the line camera is substantially synchronous to the light pulse frequency.

The measuring device in the first stretching station is preferably placed close to a first zone where the stretch film enters the first stretching station or close to a second zone where the stretch film exits the first stretching station. When the measuring device is placed where the stretch film enters the first stretching station, it is possible to determine when fracture occurs which impurities were partly responsible for the fracture. When the measuring device is placed where the stretch film exits the first station, it is possible to determine when fracture occurs which impurities were definitely not partly responsible for the fracture, and therefore which impurities are acceptable. In a practical embodiment the second stretching station is formed by the second roller of the first stretching station and subsequently the winding mechanism. In this case, when the measuring device is placed close to the second zone, where the stretch film exits the first station, the stretch film will be in a state of second stretch.

The first stretching station and the second stretching station are preferably provided with respectively a first force measuring device and a second force measuring device for measuring the force on the film in the relevant stretching station.

The predetermined result is preferably based on the force measured in the film.

The skilled person will appreciate on the basis of the above description that the invention can be embodied in different ways and on the basis of different principles. The invention is not limited to the above described embodiments. The above described embodiments and the figures are purely illustrative and serve only to increase understanding of the invention. The invention will not therefore be limited to the embodiments described herein, but is defined in the claims.

The invention claimed is:

1. A method for testing a stretch film, comprising:
   - unwinding a spool of stretch film in an unwinding station with a driven unwinding device;
   - throughfeeding through a first stretching station, wherein a predetermined first stretch is imparted to the stretch film between a first driven stretch roller and a second driven stretch roller;
   - throughfeeding through a second stretching station, wherein a predetermined second stretch is imparted to the stretch film by a third driven stretch roller;
   - determining a first force on the film during the predetermined first stretch; and
   - determining a second force on the film during the predetermined second stretch;
   wherein the first force and the second force are determined on the basis of a measurement of an unwinding torque on the unwinding device, measuring a first, second and third torque on respectively the first, second and third driven stretch roller, and a measurement of a release parameter in the unwinding device which is indicative of where the film releases from the spool.

2. A method according to claim 1, wherein the third driven stretch roller is configured to wind the stretch film onto a second spool.

3. A method according to claim 1, wherein the radius of the second spool is measured and wherein the first force and the second force are further determined on the basis of the radius of the second spool.

4. A method according to claim 1, wherein a radius of the spool in the unwinding station is further measured and wherein the first force and the second force are further determined on the basis of the radius of the spool.

5. A method according to claim 1, wherein the release parameter is indicative of the difference between a tangential reference plane of the spool and the effective plane in which the film which is pulled loose from the spool lies.

6. A method according to claim 1, wherein the release parameter is determined by moving a sensor reciprocally about at least a part of the spool, and wherein an angular position of the sensor at which the sensor performs a predetermined measurement forms the release parameter.

7. A method according to claim 1 aims, wherein the first force and the second force are further determined on the basis of a known first radius and second radius of respectively the first and second driven stretch roller.

8. A device for measuring a stretching force on a film, the device comprising:
   - an unwinding station to hold and unwind a spool of stretch film, which unwinding station has an unwinding motor for controlling the rotation speed of the spool during unwinding of the stretch film, a first stretching station with a first driven stretch roller and a second driven stretch roller for imparting a predetermined first stretch to the stretch film, and a second stretching station with a third driven stretch roller for imparting a second predetermined stretch to the stretch film, wherein the first, second and third driven stretch roller are provided with respectively a first, second and third torque meter, wherein the unwinding motor is provided with an unwinding torque meter and wherein a sensor is provided in the unwinding station in order to measure a release parameter which is indicative of where the stretch film releases from the spool, and wherein a processor is provided to calculate a first force and a second force, needed to obtain respectively the first stretch and second stretch, on the basis of the release parameter and an output of the first, second, third torque meters and the unwinding torque meter.

9. The device according to claim 8, wherein the third driven stretch roller is also provided to wind the stretch film onto a second spool.

10. The device according to claim 8, wherein the second stretching station is provided with a second spool sensor for measuring the radius of the second spool and wherein the processor is further provided to take into account an output of the second spool sensor when calculating the first force and the second force.

11. The device according to claim 8, wherein the unwinding station is provided with a first spool sensor for measuring a radius of the first spool and wherein the processor is further provided to take into account an output of the first spool sensor when calculating the first force and the second force.

12. The device according to claim 8, wherein the release parameter is measured by determining a distance between a tangential reference plane of the spool and the effective plane in which the film which is pulled loose from the spool lies.

13. The device according to claim 8, wherein the sensor provided in the unwinding station to measure the release parameter is mounted on a frame which is reciprocally movable relative to the axis of the spool, and wherein an angular position of the sensor at which the sensor performs a predetermined measurement forms the release parameter.

14. The device according to claim 8, wherein the processor is further provided to determine the first force and the second force on the basis of a known first radius and second radius of respectively the first and second driven stretch roller.

* * * * *